June 20, 1939.  S. K. MEYER  2,163,050
DEVICE FOR INDICATING THE UNDERCOVER TEMPERATURE IN A BED
Filed July 26, 1937
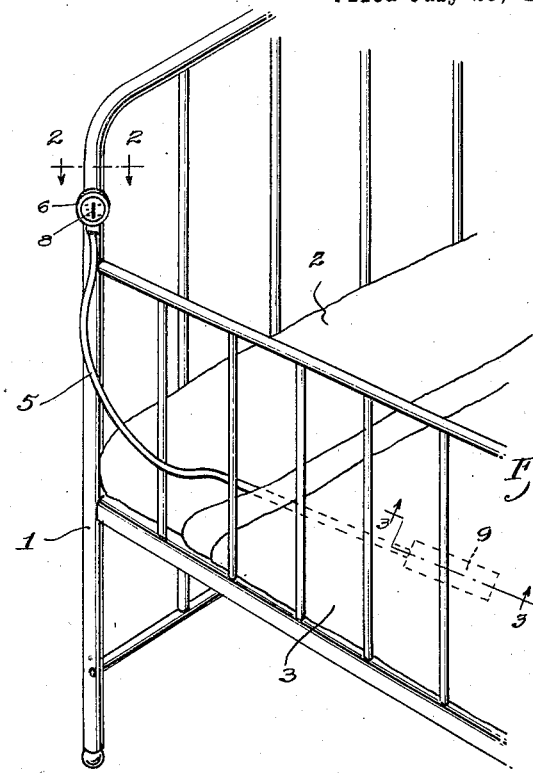
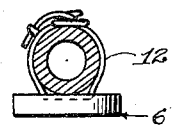
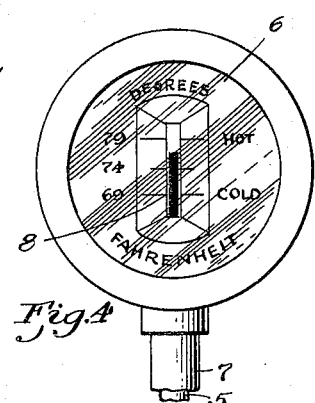
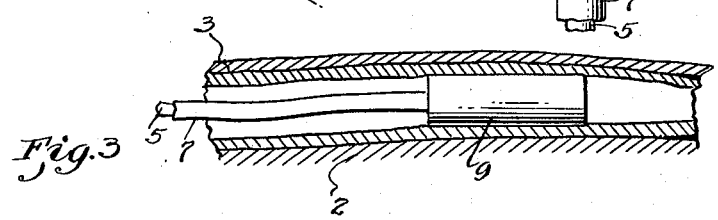
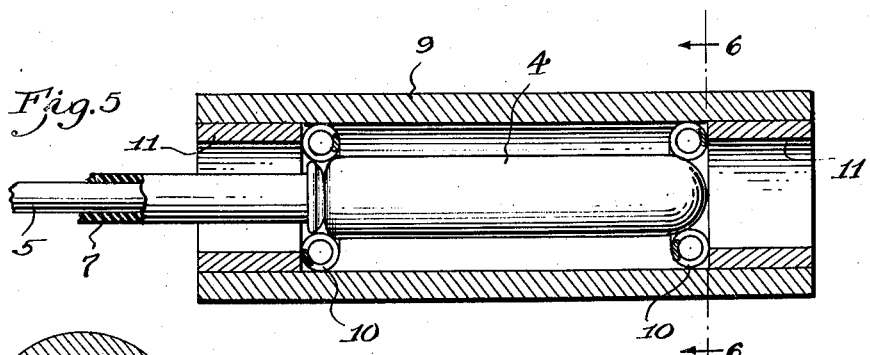
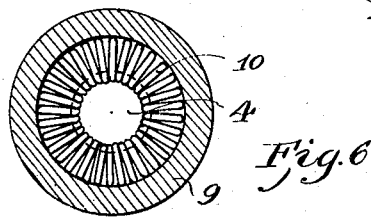
INVENTOR.
Sidney K. Meyer
BY Barnes, Kisselle, Laughlin & Raisch
ATTORNEYS Patented June 20, 1939

2,163,050

UNITED STATES PATENT OFFICE 2,163,050

DEVICE FOR INDICATING THE UNDER-COVER TEMPERATURE IN A BED

Sidney K. Meyer, Detroit, Mich.

Application July 26, 1937, Serial No. 155,614

5 Claims. (Cl. 73—343)

This invention relates to a device for indicating the undercover temperature in a bed.

At the present day medical science, in the treatment of diseases, is paying attention to the undercover temperatures as one of the several factors involved in the treatment of some diseases. For example, in the treatment of colic the pediatrician recommends keeping the infant cool in order to inhibit the bacterial or chemical reaction in the intestines which produce the gas and cause the infant to be distressed. This modern teaching of pediatrics is quite contrary to the old idea of always keeping the infant warm. The fact that medical science realizes that in the treatment of different diseases different undercover temperatures are desirable creates the problem of producing a thermometer that will accurately register the undercover temperature, that is, the actual temperature of the air beneath the covers. This means that the thermometer must be unaffected by heat radiated directly from the infant or other person's body undercover and likewise that the thermometer must not be placed in contact with the body, in which case it would be affected by heat conducted from the body.

It is the object of this invention to produce a thermometer for accurately indicating the undercover temperatures in a bed under all conditions. This object has been achieved by arranging the thermometer so that it is shielded from all the heat factors present under the bed covers affecting temperature except for the undercover air which alone is permitted to contact the thermometer.

In the drawing:

Fig. 1 is a fragmentary perspective view of a bed showing the thermometer assembled to the bed for recording undercover temperatures.

Fig. 2 is a section along the line 2—2 of Fig. 1.

Fig. 3 is a section along the line 3—3 of Fig. 1.

Fig. 4 is an elevation of the temperature indicating scale.

Fig. 5 is a section through the thermometer bulb and shield which is placed beneath the covers.

Fig. 6 is a section along the line 6—6 of Fig. 5.

Referring more particularly to the drawing there is shown a bed 1 having a mattress 2 and a plurality of covers 3.

The temperature indicating device can consist of any heat responsive or thermo-responsive element connected with any suitable indicating device. For descriptive purposes only but not by way of limitation, the temperature indicating herein shown comprises a bulb 4, tube 5 and a graduated scale 6 for indicating the temperaure in degrees Fahrenheit. The tube 5 is preferably a flexible tube of some such material as copper. The tube 5 is preferably covered with a heat insulating cover 7 but the tube 5, as is well known in the art, is preferably of very small cross-section and is provided with a very small passageway therethrough so that the thermometer is substantially non-responsive to changes in the temperature of the air or other medium surrounding or in contact with the tube 5. The interior of the bulb 4 is in communication with the interior of the tube 5 and the tube and bulb 4 form a closed system containing any suitable thermo-responsive liquid 8, such as mercury, alcohol or other well known liquid commonly used in thermometers. The bulb 4 is uninsulated and formed of a good heat conducting material such as copper, aluminum or glass.

Since it is the purpose of this thermometer to accurately record the temperature of the air under the covers in a bed, it is essential that the bulb 4 be placed under the covers 3 and above the mattress 2, as shown in Figs. 1 and 3. This thermometer, of course, is used for indicating the undercover temperatures when the bed is occupied by a human being whether child or grown-up. Since one is concerned primarily with the undercover temperature of the air adjacent the body of the person occupying the bed, it is essential that the bulb 4 be placed close to the body. However, the bulb must not contact the body or be affected by heat radiated directly from the body, otherwise an accurate temperature reading of the undercover air will not be obtained. To this end the bulb 4 is mounted in a preferably tubular housing 9 formed from any suitable well-known heat insulating material. The tube 9, for example, can be made from Bakelite provided with an asbestos or other heat insulating cover, from cardboard, or from any of the well-known thermo-plastic materials suitable for such purpose. The important thing is that the tube 9 should be made of a material that will shield or insulate the bulb 4 from heat radiated directly from the body and also prevent the bulb 4 from coming directly in contact with the body.

The tube 9 is open at each end and the bulb 4 is mounted within the tube and is spaced from the inside wall of the tube and inset from the ends of the tube. Such a mounting of the bulb 4 within the tube 9 is achieved by a pair of coil springs 10 which are positioned one at each end of the bulb and support the bulb 4 within the tube 9. These coil springs 10 are held in the tube by the bushings 11 which are fixed in each end of the tube 9. Thus, the bulb 4 is held out of contact with the inside wall of the tubular shield 9 and the undercover air is free to circulate through the tube 9 past the coil spring supports 10 and in heat exchange relation with the bulb 4.

Preferably the tube 9 is positioned under the covers 3 adjacent the body of the individual occupying the bed. As the undercover air circulates by the bulb 4 the thermo-expandible liquid 8 expands as the undercover air temperature rises and contracts as this temperature falls thus indicating on the scale 6 the undercover air temperature. As shown, the scale 6 is provided with a strap 12 by means of which it can be secured to the bed post as shown in Fig. 1.

I claim:

1. A device for indicating the temperature of the air under the covers of a bed comprising a bulb and tube connected to form a closed system, a thermo-expandible liquid in the said system, a scale associated with the said tube and liquid for indicating the undercover temperature, a heat insulating housing surrounding the said bulb and provided with openings to permit the circulation of the undercover air through the said housing and in heat exchange relation with the said bulb, the said housing having at least one of its sides imperforate whereby the said bulb is shielded from heat radiated from the body of the person occupying the bed and also insulated against direct contact with the said body.

2. A device adapted for indicating the temperature of the air under the covers of a bed when occupied by a person, comprising in combination a closed system containing a thermo-expandible liquid, a heat insulating covering for the said system including a heat insulating housing for a portion of the said system, means for mounting the said portion of the system within the housing in spaced relation therewith, the said housing having a plurality of openings permitting circulation of undercover air therethrough, said insulating housing having at least one imperforate side serving as a shield to insulate the said portion of the system from direct contact with the body of the person occupying the bed and from heat radiated directly from said body, and a scale connected with the said system cooperating with the liquid therein to indicate the temperature of the air under the covers.

3. A device adapted for indicating the temperature of the air under the covers of a bed when occupied by a person, comprising in combination a closed system consisting of a flexible tube, a transparent tubular portion for closing one end and an enlargement at the other end of the tube in the form of a bulb of good heat conducting material, a thermo-expandible liquid within the said bulb and tube, a heat insulating housing surrounding the said bulb, means for mounting the said bulb within the housing in spaced relation therewith, the said housing having at least one opening permitting circulation of undercover air therethrough, said insulating housing serving as a heat insulating shield for the said bulb whereby the housing can be positioned closely adjacent the body of the person occupying the bed and serves to insulate the bulb from direct contact with the body and from heat radiated directly from said body, and indicating means adjacent the transparent end piece of the tube cooperating with the expandible liquid to indicate the temperature of the air under the covers.

4. A device adapted for indicating the temperature of the air under the covers of a bed when occupied by a person, comprising in combination a closed system consisting of a flexible tube, a transparent tubular portion for closing one end and an enlargement at the other end of the tube in the form of a bulb of good heat conducting material, a thermo-expandible liquid within the said bulb and tube, a heat insulating tubular housing surrounding the said bulb, means for mounting the said bulb within the tubular housing in spaced relation therewith and with each end of the bulb inset from the end of the tubular housing, the said tubular housing having at least one opening permitting circulation of the undercover air therethrough, said insulating tubular housing serving as a heat insulating shield for the said bulb whereby the tubular housing can be positioned closely adjacent the body of the person occupying the bed and serves to insulate the bulb from direct contact with the body and from heat radiated directly from said body, and a graduated scale adjacent the transparent end piece of the tube cooperating with the expandible liquid to indicate the temperature of the air under the covers.

5. A device for indicating the temperature of the air under the covers of a bed comprising a thermo-expandible element, a heat insulating housing surrounding the said thermo-expandible element and provided with openings to permit the circulation of the undercover air through the said housing and in heat exchange relation with the said thermo-expandible element, the said housing having at least one imperforate side whereby the said thermo-expandible element is shielded from heat radiated from the body of the person occupying the bed and also insulated against direct contact with the said body, and indicating means operatively connected with said thermo-expandible element for indicating the temperature of the undercover air.

SIDNEY K. MEYER.